Feb. 12, 1952   H. C. MARKS   2,585,811
ELECTROCHEMICAL METHOD OF AUTOMATICALLY DETERMINING
AVAILABLE CHLORINE IN AN AQUEOUS LIQUID
Filed July 2, 1949   2 SHEETS—SHEET 1
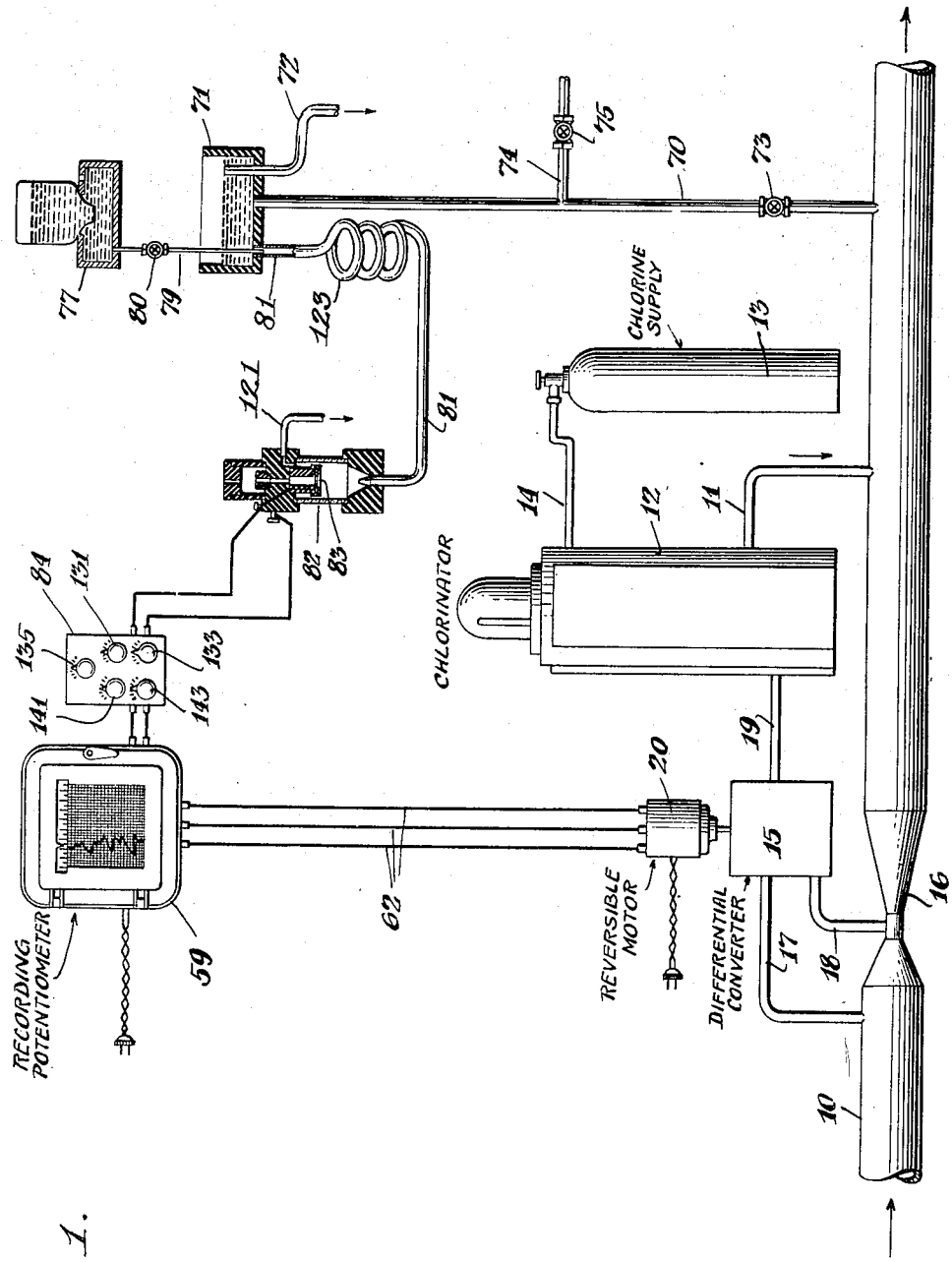
INVENTOR
*HENRY CLAY MARKS*
BY
*John C. Kerr*
ATTORNEYS

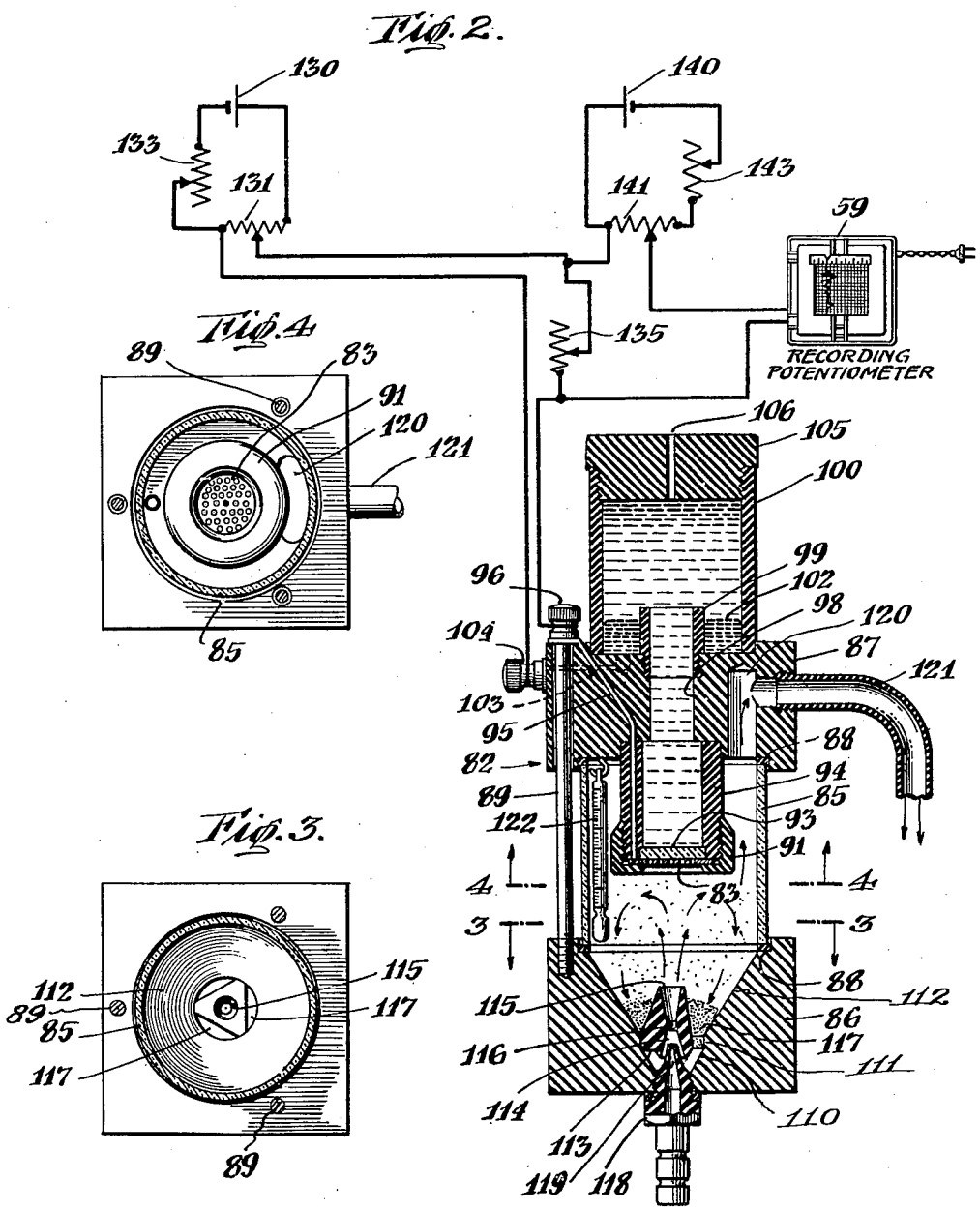

Patented Feb. 12, 1952

2,585,811

UNITED STATES PATENT OFFICE 2,585,811

ELECTROCHEMICAL METHOD OF AUTOMATICALLY DETERMINING AVAILABLE CHLORINE IN AN AQUEOUS LIQUID

Henry C. Marks, Glen Ridge, N. J., assignor to Wallace & Tiernan Products, Inc., Belleville, N. J., a corporation of New Jersey Application July 2, 1949, Serial No. 102,872

5 Claims. (Cl. 204—1)

This invention relates to a method of automatically detecting the content of available chlorine in an aqueous liquid, and more particularly to the substantially automatic electrical determination or control of the amount of available chlorine in an aqueous liquid, such as water or sewage, for indicating or recording the quantity or changes in quantity, or for controlling the quantity, of chlorine in an aqueous liquid medium, which may have been treated with chlorine and some of the chlorine used up in sterilizing the liquid to which it has been added.

As such, the present invention is a continuation-in-part of my prior and copending application, Ser. No. 566,352, filed December 2, 1944, and entitled "Electrical Determination or Control of Oxidizing or Reducing Substances in Liquids," which is now abandoned. Said application Ser. No. 56,352 was in turn a division of an earlier application, Ser. No. 372,208, filed December 28, 1940, entitled "Electrical Determination or Control of Chlorine in Liquids," which is now patented, Patent No. 2,382,734, issued August 14, 1945. The patent issued as aforesaid is directed to one division of the original disclosure of application, Ser. No. 372,208, particularly relating to the subject matter shown in Fig. 1 of the drawings of that application as originally filed. The subject matter of the divisional application, Ser. No. 566,352, corresponds to the other division of the original application, Ser. No. 372,208, and particularly corresponds to Figs. 2 to 5 inclusive of the original application Ser. No. 372,208 as filed, these figures having been cancelled from that original application prior to the issuance thereof as a patent incident to revision of the case in view of the division which was made. The present application includes also subject matter as to certain details of the method and examples thereof disclosed in neither of these earlier applications.

Among the objects of the present invention is to provide more accurate and more reliable methods of the character described and particularly to reduce or minimize known undesirable effects such as have often heretofore been encountered in the use of cells or electrodes for electrically detecting the content of available chlorine in aqueous liquids. Another and important object of the invention is to provide an improved system or method for the control or indication of the treatment of an aqueous liquid whereby substantially constant and reproducible results are obtained.

It has been found that chlorine in water or sewage at pH values ordinarily encountered appears to exist chiefly in the form of hypochlorous acids or chloramines. In some instances there may also be present dichloramines, such as $NHCl_2$, or nitrogen trichloride ($NCl_3$). Whenever any of the chlorine is thus combined with nitrogen in some one of the chloramine forms possible and actually met with in practice, it has been found that depolarization type tests wherein the chlorine was used directly to depolarize a cathode gave somewhat inaccurate results. This is true when the electrical depolarization system is calibrated to indicate available chlorine correctly when such chlorine is all in the form of hypochlorous acid. For example, one part per million chlorine in the form of hypochlorous acid does not give the same result (electrical response) as one part per million chlorine in the form of any chloramine or vice versa. Differences in pH resulted in wide differences in the electrical effect produced by available chlorine irrespective of whether the chlorine is in the form of hypochlorous acid or is combined with nitrogen as one or more of the chloramines.

It is desired, particularly in connection with relatively large scale water supply plants or systems and with sewage disposal systems wherein chlorination of the sewage is resorted to, to have an accurate means for substantially automatically indicating the amount of available chlorine present, whether it be in the form of hypochlorous acid or in the form of any or several of the possible chloramines.

Chlorine in all these forms is deemed in the art to be "available chlorine" as it is in fact available for sterilization purposes. The amount of residual chlorine remaining in the liquid is a measure of the sterilization potential available to prevent re-contamination of the liquid in question. This amount should be adequate to prevent any reasonable re-contamination and yet in a large system, such as a water supply system for a city or town, should not be so great as to give an objectionable smell or taste to the water, so as to be objectionable to the user; or should not be so great as to involve a waste of unnecessary chlorine, so as to be costly to those operating the system.

The present invention provides an automatic indicating method, which may be used to guide operators in a manual control or adjustment of the amount of chlorine being supplied, or may be used in conjunction with other automatic control means for the automatic variation and control of the amount of chlorine added initially in chlorinating the liquid in question. The use of the indication obtained in accordance with the present invention per se forms no necessary part thereof, but its use will be obvious to those skilled in the art.

It has been found in the development of the present invention that chlorine exists in water or sewage as hypochlorous acid or as one or more of the chloramines as aforesaid. As such, therefore, it does not exist in molecular form as $Cl_2$. The electromotive activity in the forms in which chlorine may exist as aforesaid is substantially less than the electromotive activity of molecular chlorine. In other words, when chlorine in solution as aforesaid is brought into contact with a polarized cathode of a depolarization type cell, it reacts less accurately and reproducibly in depolarizing the cathode, so as to control the rate of current flow through the cell, than would be the case if the chlorine were in molecular form. By supplying to the solution an iodide which can react with the chlorine quantitatively, irrespective of the form in which the chlorine has existed in the solution, so as to free iodine in the solution, there is provided a system which will give more accurate and reproducible results. This is believed to be because the iodine freed by reaction with the available chlorine exists in the aqueous solution as aforesaid in molecular form in the pH range contemplated for use in accordance with the present invention. The iodine in molecular form has a greater electromotive activity than the chlorine in the form of hypochlorous acid or chloramines. As such, the electrical response of a depolarization type cell is much greater when the iodide is supplied to the solution and the reaction quantitatively completed with the available chlorine, than would be the case if the available chlorine as initially present were subjected to the same type of depolarization test.

Summarizing the present invention, it is directed to a method for automatically detecting the available chlorine content of an aqueous liquid. This new method should be distinguished from a laboratory batch type method. The actual detection of available chlorine according to the present invention can be made automatically and sequentially upon a series of possibly separated samples, or can be made, as particularly disclosed herein, on a continuous flowing stream of the liquid in question, so as to provide a continuous indication, such as is available from many commercial indicating and recording instruments.

The present invention has particular utility in detecting relatively small chlorine contents, usually from 0 up to about 50 parts per million (hereinafter abbreviated "P. P. M."). The most common range of available chlorine content to be detected in accordance with the present invention is from 0 to about 2 P. P. M. It will rarely exceed about 5 P. P. M. The upper limit is, however, not critical, but represents a point substantially beyond which the present invention has relatively less advantage over other other methods known to the art.

The first step which may have to be taken in some instances, but not always, is to assure that the pH of the liquid to be tested in accordance with the present method has a pH within the desired range. In the event that the pH is outside the desired range, it may be brought to a point within such range by suitable buffering. When the chlorine which is to be detected is in the form of hypochlorous acid and/or monochloramines, the desired pH range may be from about 3.5 up to about 8.5, but preferably not over about 8.0. If the chlorine may be present in the form of dichloramine and/or nitrogen trichloride, then the range of pH referred for use according to the method of the present invention should be from about 3.5 to about 5.0, and preferably not over about 4.5 for the most accurate results.

The first step which is essential to the process is to establish in the liquid to be tested an iodide concentration, which is at least stoichiometrically equivalent to the available chlorine present; and then to provide sufficient time for a substantially quantitative completion of the reaction between the iodide and any available chlorine present, so that there will be a substantially quantitative conversion of the chlorine to chloride and of the iodide to iodine. This time period even under the most difficult conditions as where dichloramine is present has been found to be at least about one minute. When chlorine exists as hypochlorous acid or as monochloramine, the reaction is substantially completed in a few seconds. In practice this desired iodide concentration is preferably established by suitably adding a suitable water soluble iodide, such as potassium iodide to the liquid to be tested as hereinafter set forth.

The liquid to be tested is then introduced into contact with the polarized cathode of a depolarization type cell. Such a cell is neutral, as to the current flow therethrough, to any water-soluble iodide or to chloride as such, in each case, so that the amount of iodide added more than that necessary for the conversion aforesaid is of no substantial importance. It is sensitive, however, to the amount of iodine present in the solution, the concentration of which is effective proportionately to control the rate of current flow through the cell. This rate of current flow can then be measured by suitable electrical means and translated directly and substantially linearly into the available chlorine concentration to be detected, so that the indicator may be calibrated directly in chlorine concentration.

In the electrical sensing of free iodine in a depolarization type cell, it has been found that a very small part, in practice usually much less than 10%, of the iodine present in the solution is reduced at the cathode to iodide, so that the cell is not dependent upon a quantitative chemical conversion of the iodine supplied thereto into iodide at the cathode. It is dependent solely upon iodine concentration in the liquid, which controls the rate of current flow through the cell, so as to be rapidly and accurately responsive to this concentration. Thus the iodide, which must of course be water-soluble to the extent to which it is used, may be considered as a reducing agent, as it reduces the chlorine to chloride and simultaneously and quantitatively liberates iodine, which is accurately detectable in a depolarization type cell. In view of the substantially quantitative character of the conversion of available chlorine by iodide to liberate iodine, irrespective of whether the chlorine is in the form of hypochlorous acid or one or more of the chloramines, the determination or detection of the available chlorine by the method of the present invention is very accurate, much more so than has been found to be the case by any other known prior art method.

Other objects and advantages of the present invention will appear from the following description and appended claims, when considered in connection with the accompanying drawings, in which:

Figure 1 is a view, chiefly diagrammatic, of a depolarization system embodying the invention;

Fig. 2 is a view partly in section and partly diagrammatic of a cell (shown in vertical section) and an electrical system that may be used with the apparatus of Fig. 1; and Figs. 3 and 4 are horizontal sections of the cell shown in Fig. 2, respectively on the lines 3—3 and 4—4 thereof.

In the drawings is shown one system and a particular cell construction by which the method of the present invention may be practiced. The method may, however, be practiced by many other types of apparatus, some of which will be referred to as the description proceeds of the particular apparatus shown in the drawings.

Referring to Fig. 1, the liquid to be tested or controlled may, for instance, consist of water flowing through a conduit 10 to which chlorine is subsequently added, in predetermined or determinable amount, through a conduit 11 by means of a chlorine feeding device or chlorinator 12, which may, for example, be of the type described in United States Patent No. 1,777,987, issued October 7, 1930, to Charles F. Wallace. It will be understood that a supply of chlorine gas under pressure is contained in a cylinder 13 and fed to the chlorinator 12 through a pipe or tubing 14.

In ordinary cases, the flow of liquid through the conduit 10 may vary, for instance in accordance with the consumption or the requirements of use; and it is usually desirable to maintain at least a certain degree of proportionality between the flow of chlorine gas or solution through the conduit 11 and the flow of liquid through the conduit 10. For purposes of illustration a suitable device to accomplish such proportionality may be a differential converter generally designated 15, such as described in United States Patent No. 1,762,706, issued June 10, 1930, to Charles F. Wallace. The differential converter 15 is operated by a Venturi meter 16, which creates a pressure differential that is conveyed to pressure-sensitive elements (not shown) in the converter 15 by means of suitable pipes 17 and 18. As will be apparent from the cited Patent No. 1,762,706, the converter 15 produces a controlling vacuum which varies in accordance with variations in flow through the conduit 10, and which is transmitted to the vaccum type chlorinator 12, for control thereof, by means of the pipe 19.

The apparatus of the cited Patent No. 1,762,706 includes adjusting means for varying the ratio between the supply of chlorine and the rate of flow of the water or the like to which the chlorine is added; such adjusting means, comprising, for instance, the adjustable orifice 26 shown in Figs. 1 and 5 of the patent. Where the present invention is to be employed for automatically regulating the feed of chlorine to maintain a substantially constant or predetermined condition in the water treated, suitable means such as a reversible motor 20 may be provided to effect the desired adjustment, as by operating the stated adjustable orifice of the differential converter 15. Although other arrangements may be employed whereby a device such as the motor 20 is adapted to adjust the rate of chlorine supply or the ratio between such rate and the rate of flow of water (for example where Pitot tubes as in Fig. 6 of the patent are used instead of a venturi, the pressure differential may be too small for feasible use of an adjustable orifice, and the motor may then be arranged to adjust the position of fulcrum 17 in Fig. 6 of the cited patent, or to adjust a valve in the chlorinator such as the valve 140 in Fig. 2 of the other cited Patent No. 1,777,987), the adjustment of the orifice in the converter apparatus shown is a convenient arrangement and is therefore specifically described for purposes of illustration.

As above generally set forth, it is one of the objects of the present invention to provide a method by which it is possible accurately to determine the concentration of available chlorine in an aqueous liquid. Chlorine is oxidizing in character. In accordance with the present method there is added to the liquid prior to the actual determination of the available chlorine as such, a material having the opposite oxidizing effect from that of chlorine; i. e. a reducing agent in this instance. Furthermore, this reducing agent in accordance with the present invention is a water-soluble iodide. The iodide added must be present in at least as great a stoichiometric ratio as the concentration of the available chlorine to be determined. The reason for use of an iodide is that it has been found that water-soluble iodides, such as potassium iodide reacts with chloramines with such rapidity that depolarization cells with which they may be used will indicate accurately the concentration of available chlorine present in the form of chloramines as well as that present as in the form of free hypochlorous acid. In order to effect such determination in an accurate and reproducible manner, the pH of the solution, when the iodide is added for the interchange reaction to produce iodine in an amount proportional to the available chlorine initially present, as well as during the subsequent depolarization test, is reasonably critical and must be kept in a predetermined range. This will be set forth in greater detail hereinafter.

In Fig. 1 chlorine is supplied to the conduit 10 in proportion to the rate of flow of the water; and the rate of chlorine supply is adjusted or trimmed in accordance with variations of voltage in the input of a potentiometer controller 59, conveniently in such manner as to maintain the chlorine supply ratio at a desired point or range. Potentiometer controllers of the type illustrated and contemplated for use in the present method are well known and may be purchased in the open market. Only the treated water is sampled through a pipe 70 to a constant level box 71, which has an outlet 72 to waste. The pipe 70 has a valve 73 and a branch or tap 74 with a valve 75 therein, intermediate the valve 73 and the box 71. Thus for calibration purposes, the valve 73 may be closed and with valve 75 open, untreated water may be fed to the box 71 and the hereinafter described testing instrumentalities; for normal operation the valve 75 is closed and the valve 73 open to provide a constant sampling of the treated water.

By means of a constant head or feed device 77 and through a pipe 79 extending downwardly therefrom and having a flow control valve 80, a suitable reagent (i. g. a water-soluble iodide, such as potassium iodide) is fed to the sampled liquid as it leaves the box 71 through a pipe or conduit 81. The conduit 81 feeds the treated medium and the added reducing agent to a cell generally designated 82, whence the liquid passes on to waste through an overflow pipe 121.

Advantageously, suitable means, such as a lengthened portion of the conduit 81, may be provided for increasing the time of liquid flow to the cell; for example, the conduit may comprise a rubber hose or the like having a multiplicity of loops or convolutions 123 through which the liquid flows. The total length of the conduit 81 may be such as to afford the desired delay of liquid travel, for example, for from two to five minutes (or such shorter or longer time as is desired with a given reagent and system), so as to permit the reagent to react with any chloramines, free hypochlorous acids or similar materials present in the liquid. In the case of the reaction in question, i. e. chlorine in the form of one or more of the chloramines with iodide, the time required for the substantially quantitative completion of the reaction is at least about one minute as a maximum. This may be provided by the use of an apparatus such as is shown provided with the loops or convolutions 123 of the necessary length to give this time delay. In this fashion, the apparatus may be made to detect, with high accuracy, the presence and concentration of compounds of the character stated, fully representing the active remainder, so to speak, of the chlorine supplied by the chlorinator 12.

As stated, the system of Fig. 1 includes a cell 82, which has an electrode 83 in contact with the liquid under test and is adapted for electrical response to the concentration of available chlorine in the liquid. There are also conveniently provided certain electrical control instrumentalities intermediate the cell and the recording meter or potentiometer 59 and contained in a control box 84. It may in some instances be found desirable to keep one electrode out of contact with the water or other liquid to be tested. The specific system here illustrated is designed for operation on the principle of cathode depolarization; and in consequence the cell is designed to keep the anode out of contact with the liquid.

The structure of a suitable form for cell 82, and of the associated electrical instrumentalities contained in the control box 84, is shown in more detail in Figs. 2 to 4, to which attention is now directed.

The cell comprises a cylindrical housing 85, conveniently of glass, which is clamped between hard rubber blocks 86 and 87 with the cooperation of interposed live rubber gaskets 88, and advantageously by means of a plurality of clamping rods or bolts 89.

The electrode 83, which is preferably made of gold, platinum or other rare metal, is perforated with holes in the form of a sieve and is secured by a suitable hard rubber clamping ring 91 to the underside of a porous porcelain disc 93. The clamping of the electrode, which has its peripheral edge engaged by the ring 91, is conveniently effected by threaded engagement of the ring with a hard rubber tube 94 that extends down into the cylindrical housing 85. The porcelain disc 93 is seated on the lower end of the tube 94, so that the ring 91 clamps the electrode 83 and the disc 93 together and in place at the end of the tube 94, as shown. The tube 94 is pressed or cemented into an appropriate recess in the underside of the block 87. A lead wire 95 is swaged to the top side or edge of the electrode 83 and extends to a binding post 96, conveniently on the end of one of the clamping rods 89. In some cases, it is desirable to coat the upper or inner surface of the rare metal electrode disc 83 with a suitable insulating lacquer (not shown), so as to retard or prevent any undesirable action (on the face of the electrode next to the porcelain disc 93) due to the employment of a corrosive solution within the tube 94 and the associated chamber hereinafter described. This construction is not claimed herein, but is disclosed and claimed in my Patent No. 2,382,735, granted August 14, 1945.

The upper end of the tube 94 opens into an aligned tubular passage 98, which extends vertically through the block 87 and is itself extended above the upper surface of the block by a further tubular element 99, which may be threaded into the block 87, as shown. A somewhat larger cylindrical member 100 is pressed or cemented into the upper surface of the block 87, so as to provide a chamber which communicates with the tube 94 through the tubular passage structure 98, 99 and into which the member 99 extends upwardly, so as to provide an annular cavity or recess about the outer surface of the tube 99. In this cavity there may be disposed a quantity of mercury 102 for contact with liquid within the cylindrical member 100. Electrical connection with the mercury 102 is afforded by a lead wire 103 extending to a binding post 104. The upper end of the member 100 is closed with a suitable cap 105 threaded therein and having a vent 106.

The lower block 86 of the cell is provided with a recess that opens into the chamber within the housing 85, and comprises a lower, upwardly flaring, frusto-conical opening 110, a cylindrical bore 111 and a further upwardly flaring frusto-conical opening 112 which communicate directly with the space within the housing 85. A Venturi member 113, say of hard rubber, is fixedly mounted in the cylindrical bore 111 and has a vertical internal passage comprising oppositely directed frusto-conical openings 114, 115, terminating at their smaller ends in a cylindrical opening or throat 116. The exterior surface of the Venturi member 113 is shaped somewhat in the form of a pair of triangular pyramids joined at their bases in the region of the bore 111, so as to provide openings 117 through which material may pass or drop from the frusto-conical opening 112 into the frusto-conical opening 110.

From the bottom of the block 86, a fitting 118 provides for admission of liquid to the cell and includes a nozzle 119 that extends within the lower frusto-conical opening 114 of the member 113. It will thus be seen that when liquid under suitable pressure or head is supplied to the fitting 118, the nozzle 119 and member 113 constitutes a venturi through which the liquid passes as it enters the cell chamber within the housing 85.

A suitable quantity of abrasive material, such as particles of alundum, garnet, emery, sand or other suitable abrasive or scouring materials, preferably of non-conducting character, is initially placed in the opening 110, or the openings 112 and 110. When liquid under pressure is supplied to the fitting 118, a jet thereof issues from the nozzle 119 through the passage of the venturi member 113 and impinges upon the lower or exposed surface of the electrode 83. Abrasive material is automatically entrained in the jet, and thus produces a scouring or rubbing action on the electrode surface, which tends to clean the surface and specifically to remove undesirable material that might collect and foul or otherwise desensitize the electrode surface. As the abrasive material is heavier than the liquid flowing through the cell, it does not escape with the liquid, but drops downwardly into the opening 112 and usually through the openings 117, for reentrainment in the jet. It will now be understood that the jetting action and entrainment of abrasive particles is automatic and continuous as long as liquid under pressure is supplied to the cell through the fitting 118. Escape of liquid from the cell is through an upward pasasge 120 in the upper block 87, which communicates with the overflow pipe 121. The chamber encompassed within the cylindrical member 100 and through the described tubular structure to the upper surface of the porcelain disc 93, is conveniently filled with a neutral salt solution, for example, a saturated aqueous solution of potassium chloride, and thus forms a salt bridge between the electrode 83 and the annular body of mercury 102.

As stated, the cell is connected for operation on the principle of electrode depolarization, and for purposes of illustration, the connections are shown for the convenient arrangement of cathodic depolarization, i. e. so that response is had to the depolarizing effect of the iodine freed by reaction with the available chlorine present in the liquid to which iodide has been added, the iodine then serving to depolarize the cathode 83 in the circuit now to be described.

A circuit comprising a battery 130, a potentiometer 131, and a rheostat 133, provides means whereby from the variable output of the potentiometer 131, any desired voltage may be applied to the cell circuit. The cell, represented by its terminals 96, 104, and a variable voltage dropping resistance 135, are connected in series across the output of the potentiometer 131. A convenient value under the circumstances for the E. M. F. of the battery 130 is 1.5 volts; and the rheostat 133 may have a total resistance of 2000 ohms; the potentiometer 131, a total resistance of 1000 ohms; and the voltage dropping resistance 135, a total resistance of the order of 10,000 ohms.

A further circuit comprising a battery 140, a potentiometer 141, and a rheostat 143, may comprise a network having similar values to those given, by way of example, for the circuit of the battery 130. The network, including the battery 140, conveniently serves to provide a biasing voltage across the variable output of the potentiometer 141, which is connected in circuit with the voltage dropping resistance 135 and the input of the recording potentiometer 59. It may be explained that the biasing voltage produced across the output of the potentiometer 141 may be placed in either an opposite or an additive relationship (depending on the polarity of the battery 140) to the voltage produced across the resistance 135 whereby means are provided for biasing the indicator or pen arm of the recording potentiometer 59 to any desired position.

As will now be understood by those skilled in the art, current is caused to flow in the circuit comprising the cell (and including its electrodes 83, 102), the potentiometer 131 and the resistance 135. Assuming that the indicator or recording pen of the potentiometer 59 has taken a position corresponding to a given net voltage determined by the combination of the voltages across the resistance 135 and the output of the potentiometer 141 (as explained hereinabove), a change in the flow of current in the circuit of the cell will produce a corresponding change in the voltage drop across the resistance 135, and cause the arm of the meter 59 to take up a new position and reading in consequence. It will further be seen that the changes in reading of the recording potentiometer 59 may thus be directly and readily correlated to changes in voltage drop across the resistance 135, or, more specifically, to such changes in current through the circuit through this resistance and the cell 82, as are occasioned by changes in composition of the liquid passing through the cell chamber within the housing 85.

As stated, a predetermined voltage is applied to the circuit of the cell 82 from the network including the battery 130; and the effect of the residual chlorine in the water supplied to the cell is to oxidize a part of the added iodide, thus producing electrode depolarization (at the electrode or cathode 83) to an extent depending upon the amount of residual available chlorine originally in the water. Changes in the residual available chlorine thus create changes in current in the cell circuit and corresponding voltage variations across the resistance 135; and it will thus be seen that the corresponding registration of these voltage changes by the recording potentiometer 59 can be readily correlated to the residual available chlorine content of the sampling of treated water which is delivered to the testing system.

Changes in the temperature of the liquid flowing through the cell ordinarily tend to affect the readings obtained from the potentiometer 59; and therefore a thermometer 122 is shown suspended within the cell to indicate the temperature of the liquid, whereupon suitable correction may be applied to the chart readings of the potentiometer recorder 59; or corresponding correction may be made by adjustment of the rheostat or variable resistance 135, to compensate for the temperature changes. In this fashion, a true reading, so far as residual chlorine is concerned, may be obtained by the translating device.

The operation of the system shown in the accompanying drawings will now be readily understood by those skilled in the art from the foregoing description. As detected by the cell 82 and translated by the electrical instrumentalities, changes in available chlorine concentration of the treated water are indicated by the potentiometer recorder 59 and may be caused to vary the feed of chlorine from the chlorinator 12 (through operation of the motor 20 and adjustment in the converter 15) in order to keep the residual free or available chlorine content of the treated water substantially at a predetermined point or range. At the same time, in accordance with the present invention, the tested liquid is supplied to the cell in the presence of a predetermined concentration of a water-soluble iodide preferably in such amount (a stoichiometric excess) as to provide for complete reaction of the residual available chlorine with the iodide or a part thereof. Tests have revealed that with the addition of a water-soluble iodide in substantial quantity and preferably in quantity of the order last stated, the accuracy and reliability of the electrical detection is greatly improved; it being believed that difficulty incident to chemical or electro-chemical action on the material of the electrode 83 is obviated or minimized, and that the addition of the iodide affords in other respects a truer indication of the concentration of available chlorine, particularly when it is in the form of chloramines.

The method of the present invention, while applicable to a large range of available chlorine concentrations for indicating such concentrations, is practically most useful when the available chlorine concentration is relatively low as from 0 to 2 P. P. M. and rarely over 5 P. P. M.

The low limit of available chlorine concentration which may be indicated by the method may be considered zero for all practical purposes. The maximum limit of chlorine concentration to which the present invention applies is not definite and is not critical. However, the peculiar advantages of the present invention become progressively less and the need for the procedure of the present invention is less as the chlorine concentration exceeds about 50 P. P. M. The present invention in fact has its maximum value in the lower portion of this range. At ranges of concentration above about 50 P. P. M., other known methods of indicating chlorine concentration may be sufficiently accurate so that resort need not be had to the present method.

While it is usually preferred to use a highly soluble iodide, such as potassium iodide, as the reducing agent in the present case, other water-soluble iodides could be used in lieu thereof. The important feature is that the iodide shall be water-soluble in the concentration at which it is to be used. Among the other iodides contemplated for use as alternatives (not inclusive) are sodium iodide and calcium iodide. It is preferred to employ a highly water-soluble iodide, so that such material may be made up as a relatively concentrated stock solution of some predetermined concentration to be kept in a suitable container as shown at 77, Fig. 1, and then supplied as hereinabove taught to the successive portions or to the flowing stream of the liquid to be analyzed, so as to establish a desired relatively low iodide concentration in the liquid to be tested. Potassium iodide lends itself admirably to all these purposes, and from the points of view of the iodide concentration to be established, is about as cheap as any other available iodide compound. It is, therefore, the preferred form of reducing agent in accordance with the present invention. Some iodides, such as lead iodide, are relatively slightly soluble, but may still be operative and effective in the performance of the method of the present invention as the solubility is adequate to supply the necessary iodide ion concentration for reaction with available chlorine in the concentration to be expected in many liquids to be tested. When such a relatively slightly soluble iodide is used, it may be supplied in solid form to a portion of the liquid to be tested and some, but not all of it, dissolved therein. The iodide to be used is preferably of an inorganic nature, as such compounds are usually better adapted to use under the conditions hereinabove set forth for this test.

The iodide must of course be present in a concentration at least stoichiometrically equivalent to the available chlorine to be determined, as otherwise all the iodide would be converted to iodine and yet some available chlorine left over which could not be accurately indicated for the same reasons for which the original available chlorine cannot be accurately indicated by a depolarization type test as hereinafter set forth. The maximum limit for the iodide concentration is not critical. As long as there is enough to give a quantitative reaction with all the available chlorine present, the desired accurate results will be obtained. If a greater amount of iodide be added than is necessary, within reasonable limits, no undesired effects are had from the operation of the system or the practice of the method. From a practical point of view, however, it is rarely if ever necessary in practicing the present method to use more than about 180 P. P. M. of iodide (calculated as iodide ion). Economy usually dictates a substantially lower concentration, particularly where the stoichiometric equivalent of the maximum chlorine to be expected is in a relatively low range.

While it is to be considered within the purview of the present invention to practice the process in a somewhat discontinuous manner as distinguished from a strictly continuous process, the present invention is not intended to cover a purely laboratory type analytical method, wherein separate batches as in a beaker are analyzed manually. The present invention, however, is intended to cover all substantially automatic methods of detecting chlorine concentration and the changes therein when the detection is carried on regularly in connection with a succession of samples or portions, best termed "successive portions" of the liquid to be analyzed and tested, and wherein these successive portions are substantially automatically treated in the same way and successively exposed to the cathode at least of a depolarization type cell, so that successive readings of the cell current will be obtained for said portions respectively. In most instances, however, it will be found most convenient to operate the method in a manner similar to that shown in the accompanying drawings and hereinabove described, i. e. continuously, where a sample such as a continuously flowing stream of the liquid to be tested is caused to travel in a predetermined path, at one portion of which the iodide is added, a sufficient time delay to permit substantially quantitatively complete reaction is then provided, and at a subsequent portion of the path the liquid is caused to flow through a portion at least of a cell in contact with the polarized cathode thereof.

The present method is not restricted to being performed by the one type of cell herein particularly shown and described. It may also, for example, be performed using the cell or cells disclosed in the patents to Wallace, No. 2,350,378, granted June 6, 1944, and No. 2,415,067, granted January 28, 1947. It may further be performed using cells as shown and described in the copending applications of Wallace, Ser. Nos. 13,277 and 718,228, filed respectively March 5, 1948, and December 24, 1946. Other types of cells of the depolarization type wherein a liquid may be brought into or passed in contact with a polarized cathode and where the rate of current flow across the cell may be accurately determined and indicated will also lend themselves to use in the practice of this method. On the other hand, it has been found that the present method, relying as it does upon the concentration of iodine in an aqueous liquid to control a degree of depolarization and hence to control a rate of current flow across the cell, is substantially independent of the amount of electrolytes in the liquid, the conductivity of the cell, the voltage drop across the cell (which is usually held substantially constant), and also is independent of the completeness or lack of completeness of any electrolytic action taking place within the cell, in the sense of the reduction of iodine to iodide at the cathode. In practice it has been found by actual tests that this reduction occurs to an extent corresponding to less than 10% of the total amount of iodine passing through the cell. Even the extent of this electrolytic action is immaterial in the practice of the present method, which is dependent solely upon the iodine concentration for a control of current flow and not upon a quantitative completion of any electrolytic chemical reaction.

As above generally set forth, the maintenance and control of pH within certain limits is essential to the practice of the present method and is critical within the limits hereinafter specifically set forth as to the accuracy of the results to be obtained by this method. In practically all instances it is desired that the pH of the sample of the liquid being tested and that of this sample at the time the iodide is supplied thereto and thereafter be always at least about 3.5. The reason for this is that any trivalent manganese or nitrite ions present in the liquid will tend to liberate iodine from iodide at pH values substantially below this value. It often happens that there is enough of one or both these types of ions to cause substantial error even when drinking water is being tested.

When the available chlorine in the water to be tested in accordance with the present method and the present invention contains no substantial quantity of either dichloramine (as NHCl₂) or nitrogen trichloride (NCl₃), it is possible to operate the method satisfactorily with liquids having pH values up to about 8.0 to 8.5. The preferred range, however, under these circumstances when the available chlorine is either in the form of hypochlorous acid or monochloramines or both is about 3.5 to about 7.0.

In the event that some of the available chlorine may be in the form of dichloramines or nitrogen trichloride, or both, then the pH limits, for maximum accuracy, should be kept within a much narrower range. In this instance the low limit of pH is the same, about 3.5, for the reasons given above. The high limit for pH under these conditions, however, is about 5.0. The preferred range of pH under these conditions is about 3.5 to about 4.5.

It has further been found by actual practice of this method that when dichloramines or nitrogen trichloride, or both, may be present, and when the available chlorine concentration is not over about 5 P. P. M., as in the usual case, the iodide concentration to be established should preferably be from about 20 to about 50 P. P. M. The low limit is always chosen, however, so as to provide at least the stoichiometric equivalent of the available chlorine present.

The following are examples of the accuracy of the determination according to the method of the present invention:

Example I.—Newark, N. J., tap water was treated with chlorine in different amounts over the range usually encountered in water purification. A sample was continuously passed through a cell as taught herein at a rate of 300 ml. per minute. The temperature was about 60° F. and the pH of the water used was about 7. When no iodide was added in accordance with the present invention, the current flowing through the cell amounted to 8 microamperes for each P. P. M. available chlorine in the water. The precision of measurement in the range of 0 to 1 P. P. M. was found to be plus or minus 0.3 microampere. Therefore, the total error amounted to 3.76%. Using the same apparatus and method, but operating in accordance with the present invention by adding 5 P. P. M. potassium iodide to the water prior to introducing it into the cell, it was found that current flowing through the cell was 14 microamperes for each P. P. M. available chlorine. Since the precision of measurement was still 0.3 microampere plus or minus, the total error was now reduced to plus or minus 2.1%.

Example II.—The advantage of the present invention is further shown when water is first treated with alkali to raise the pH to 8, such as often occurs in Midwestern waters. The test results were the same as given in Example I with the exception of pH. In this case without the addition of potassium iodide, the cell current amounted to 2.5 microamperes per P. P. M. available chlorine, equivalent to error of plus or minus 12%. When potassium iodide was added to establish an iodide concentration of 5 P. P. M. the current was 13 microamperes for each P. P. M. available chlorine, reducing the error to plus or minus 2.3%.

Example III.—The type of cell herein disclosed and many other types are most advantageously operated at a cathode potential of a few millivolts negative with respect to the saturated calomel electrode. With ordinary tap water, this arrangement gives a current at zero chlorine concentration and only 1 or 2 microamperes. This obviously has the advantage of avoiding the difficulty of using as a measure of available chlorine the difference between two numbers, each of which would be large in respect to this difference. Under such circumstances, this type of cell gives no change in current flowing when the available chlorine in the water is in the form of chloramines. This is a serious limitation on this arrangement under ordinary circumstances.

However, on adding 5 P. P. M. potassium iodide in the manner described above, the concentration of available chlorine up to 1 P. P. M. gives the same amount of current regardless of whether the chlorine is in the form of chloramines or hypochlorous acid or hypochlorite.

As an example of the increased electrical effect produced by following the method of the present invention, when a liquid, having a pH of about 8 and having 0.8 P. P. M. available chlorine, is introduced into contact with the cathode of a depolarization type cell, and with no iodide present, the cell current is about 2 microamperes. With other conditions remaining the same, but iodide present, in accordance with the present invention, the cell current is 21 microamperes.

As above generally set forth, the errors in the results obtainable following prior art procedure can be subdivided or classified as follows: first, errors due to variation in pH, and, second, errors due to the form in which the available chlorine exists, for example, as hypochlorous acid on the one hand, or one or more of the chloramines on the other.

Considering now the results obtainable by the use of the present method in overcoming the error due to pH variation, it has been found that when all the available chlorine is in the form of hypochlorous acid and with no iodide present, with 1 P. P. M. chlorine, the following readings in microamperes are obtained with different pH's: at pH 5 the current flow will be 24 microamperes while at pH 6.9 the current flow is about 10 microamperes, the temperature in both instances being about 68° F. On the other hand, when following the present invention, and with other conditions substantially the same, the maximum variation in the cell current is about 1 microampere for different pH values from 4.2 to 6.8; and the value of cell current for 1.0 P. P. M. available chlorine is about 21 microamperes.

When the available chlorine is all in the form of dichloramine and when following prior art teachings so that no iodide is present, there was found to be a cell current of 10 microamperes at pH 4.1, 9.4 microamperes at pH 5.1, and 5.4 microamperes at pH 6.8. This shows a substantial variation in cell current response with nothing changed except pH. In fact, changing the pH from 6.8 to 4.1 introduces an error of approximately 100% based upon the cell current value at pH 6.8. On the other hand, when iodide is present, and the method of the present invention is followed, even at a pH value of 6.5 (which is outside the preferred range when dichloramine is present) the percentage error for the same pH change is reduced to about 51%. However, if the pH is kept within the desired range for a liquid which may contain dichloramine following the present invention and iodide is present, a pH variation within the preferred range of about 3.5 to about 4.5 does not cause any substantial variation in cell current. Thus a pH variation within the preferred range may be considered negligible in its effect.

Let us consider now the error present in following prior art practices introduced by variation in the state in which the available chlorine exists at one time or another, i. e. whether it is in the form of hypochlorous acid or one or more of the chloramines. With the pH of 7.0 in all instances, the temperatures being substantially the same in all cases, when no iodide is present, an available chlorine content of 1.0 P. P. M. gives a cell current of about 8.6 microamperes when the chlorine is in the form of hypochlorous acid. When, however, the chlorine is all in the form of monochloramine and all other factors are unchanged, the same available chlorine concentration gives a cell current of only 2.8 microamperes. As compared with this obvious error, when the method of the present invention is used, and with the same concentration of available chlorine, i. e. 1.0 P. P. M., the cell current is 15.5 microamperes irrespective of whether the chlorine is in the form of hypochlorous acid or monochloramine, no perceptible difference being found under these conditions.

A similar comparison was made at pH 8, at substantially higher temperatures (both, however, being room temperatures respectively on different days). Under these circumstances and using prior art practices, when the chlorine was in the form of hypochlorous acid, a cell current of 2.0 microamperes was obtained. When, however, the available chlorine was all in the form of monochloramine, the cell current was only 1.6 microamperes. Thus if the lower values were taken as a basis, there is a 25% error between these two values. When, however, the present invention was employed and iodide in the form of potassium iodide was present, other conditions being the same, the value of cell current when all the chlorine was in the form of hypochlorous acid was 26 microamperes and when all of it was in the form of monochloramine, was 25.5 microamperes. Thus again if the error were calculated as a percent, based upon the lower of the two values, the error is only approximately 2%.

When operating in accordance with prior art practices so that no iodide is present, the pH in both instances being about 4, the total available chlorine in both instances being 1.0 P. P. M., when this chlorine is in the form of hypochlorous acid, the cell current was found to be 26 microamperes. When, however, this chlorine was in the form of dichloramine, other conditions remaining the same, the cell current was found to be 10.0 microamperes. When, however, the present invention was followed, other conditions being substantially the same, the cell current was 23.5 microamperes irrespective of whether the chlorine was present in the form of 100% hypochlorous acid or 100% dichloramine.

In a similar way it has been found that when the available chlorine is in the form of either dichloramine or nitrogen trichloride, and where the pH is maintained within the preferred range of about 3.5 to about 4.5, the errors introduced by change in pH are relatively negligible, assuming in all instances that the method of the present invention, including iodide, is used. When, however, the pH is increased to a value substantially over about 5.0, the error introduced by pH variation becomes progressively larger and the conditions progressively less desirable. This is so even though at higher pH ranges, the error is in fact substantially reduced by employing the method of the present invention.

Investigation has also been made of the speed of reaction between iodide and available chlorine in different forms. When the chlorine is in the form of dichloramine or nitrogen trichloride, which are the most difficult situations to be encountered, it is found that the reaction is substantially quantitatively complete after about 1 minute. For example, at one minute, the value of cell current is approximately 98% of the maximum theoretical value which is attained at an indefinitely long period of time. However, when the chlorine is in the form of hypochlorous acid or monochloramine, the time period required for substantially quantitative completion of the reaction is much less, and is in the order of magnitude of about 10 seconds. Thus in practice it is customary to provide apparatus affording a contact time adequate for the most difficult situations, namely one which will afford at least about one minute contact time prior to exposing the liquid to be tested to the depolarization cell test.

Certain statistical data have been given as a result of actual experimental work wherein the chlorine was all in the form of hypochlorous acid on the one hand, and all in the form of dichloramine on the other. It has been shown wherein these conditions can cause various results. When the actual condition encountered is an intermediate one, i. e. part of the chlorine is in the form of hypochlorous acid and a complementary part in the form of one or more of the chloramines as dichloramine, the results obtained in practice have been correspondingly proportional to the terminal conditions herein described and could be determined by pro-rating the figures given.

The numerical data hereinabove given of cell current was determined in each case, using a particular electrolytic cell corresponding substantially to that shown and described in Wallace application Ser. No. 13,277 filed March 5, 1948. It is recognized that if some other type cell were used in lieu of the one particularly used in obtaining this data, and if the other cell had for example a different cathode area, the absolute numerical values of cell current would be different. The relative or proportional values of the cell currents under different conditions would, however, be essentially the same.

In the tests made, the liquid used was Belleville, N. J., tap water, suitably adjusted as to pH to give the several values hereinabove noted and with the available chlorine content established and adjusted as particularly herein noted. This water was caused to flow through the cell as a continuous stream at the rate of about 330 cc. per minute in each instance. The temperature in each instance was room temperature, but varied in some of the tests from about 66° F. to about 75° F. in other tests. Where the difference was pertinent, reference is made hereinabove to this effect. In each case the iodide concentration used (established by adding a solution of potassium iodide) was about 50 P. P. M. (calculated as KI).

It was further found that the values for nitrogen trichloride are substantially the same, and the rule pertinent thereto the same, as in the case of dichloramine. These two, however, were found to act essentially different from monochloramine which acts more nearly like hypochlorous acid. This relationship is contrary to what has been stated in certain scientific articles which have been written from time to time.

When some of the chlorine is in the form of dichloramine or nitrogen trichloride, then in order that the reaction with the iodide be quantitative, the pH must be kept within the preferred range of about 3.5 to about 5.0 and preferably not over about 4.5. On the other hand, the reaction of iodide with monochlormine is quantitative at a wider pH range, namely from about 3.5 to about 8.5. In both instances, however, the low limit is dictated, not by the quantitative completeness of this reaction, but rather by the possibiliy of the liberation of iodine by other materials which may be present as aforesaid.

From the above it will be seen that pH control to some value within the limits given is highly important in the practice of this method. In the event that the pH of the liquid being tested is initially at a value within the desired range as herein set forth, then of course no positive steps need be taken in adjusting or maintaining the pH. On the other hand, in the event that the pH is found to be outside the desired range, it may be brought to a value within such range by suitable buffering. For example, when the pH is to be adjusted to a value of 5 or less, a combination of acetic acid and sodium acetate may be used. When the pH is to be adjusted to a value of about 7, a combination of $KH_2PO_4$ and $Na_2HPO_4$ may be used. Other known buffer combinations may be used in accordance with standard text books on the subject, as long as the buffer materials used will not themselves serve to free iodine from iodide or serve to affect the current flow in a depolarization type cell. The particular buffer to be used or combination of buffer materials is per se no part of the present invention, the examples given being, however, some of those which have been found useful and effective in practice.

While there is herein shown and described but one type of apparatus in which the method may be carried on, many references have been made herein to other equivalent apparatus by which the method can be performed, so that it is not limited to being performed in any one single type of apparatus. Furthermore, the variations of the method have been taught and the limitations within which the method is effective, as well as something of the numerical accuracy of the determinations resulting from the practice of the method. I do not wish to be limited, therefore, except by the scope of the appended claims.

What is claimed is:

1. The method of automatically and accurately detecting the content of available chlorine in an aqueous liquid, wherein accurate results are obtainable even when some of said available chlorine is in the form of dichloramine or $NCl_3$ or both, which comprises the steps of adding an amount of a water-soluble iodide to successive portions of said liquid having a pH in the range of about 3.5 to about 5.0 to establish in said portions an iodide concentration at least stoichiometrically equivalent to the amount of said available chlorine to be detected, thereafter and after a time period of at least about one minute to afford time for the substantially quantitative completion of the reaction between said available chlorine and the added iodide, introducing said portions successively into contact with the polarized cathode of a depolarization type electrolytic cell, and measuring the current flow through said cell as accurately indicative of the available chlorine concentration in said successive portions.

2. The method of continuously, automatically and accurately detecting the content of available chlorine in an aqueous liquid, wherein accurate results are obtainable even when some of said available chlorine is in the form of dichloramine or $NCl_3$ or both, which comprises the steps of continuously adding a water-soluble iodide to said liquid, which has a pH in the range of about 3.5 to about 4.5, to establish in said liquid an iodide concentration at least stoichiometrically equivalent to the amount of said available chlorine to be detected, thereafter and after a time period of at least about one minute to afford time for the substantially quantitative completion of the reaction between said available chlorine and the added iodide, continuously introducing said liquid into contact with the polarized cathode of a depolarization type electrolytic cell, and continuously measuring the current flow through said cell as accurately indicative of the available chlorine concentration in said liquid.

3. The method of continuously, automatically and accurately detecting the content of available chlorine in an aqueous liquid, wherein accurate results are obtainable even when said available chlorine is present in a concentration from 0 to about 50 P. P. M. and wherein some of said available chlorine may be in the form of dichloramine or $NCl_3$ or both, which comprises the steps of continuously adding a water-soluble iodide to said liquid, which has a pH in the range of about 3.5 to about 4.5, to establish in said liquid an iodide concentration at least stoichiometrically equivalent to the amount of said available chlorine to be detected and not over about 180 P. P. M., thereafter and after a time period of at least about one minute to afford time for the substantally quantitative completion of the reaction between said available chlorine and the added iodide, continuously introducing said liquid into contact with the polarized cathode of a depolarization type electrolytic cell, and continuously measuring the current flow through said cell as accurately indicative of the available chlorine concentration in said liquid.

4. The method of continuously, automatically and accurately detecting the content of available chlorine in an aqueous liquid, wherein accurate results are obtainable even when said available chlorine is present in a concentration from 0 to about 10 P. P. M. and wherein some of said available chlorine may be in the form of dichloramine or $NCl_3$ or both, which comprises the steps of continuously adding a water-soluble iodide to said liquid, which has a pH in the range of about 3.5 to about 4.5, to establish in said liquid an iodide concentration of about 20 to about 50 P. P. M., and which concentration is at least stoichiometrically equivalent to the available chlorine in said liquid, thereafter and after a time period of at least about one minute to afford time for the substantially quantitative completion of the reaction between said available chlorine and the added iodide, continuously introducing said liquid into contact with the polarized cathode of a depolarization type electrolytic cell, and continuously measuring the current flow through said cell as accurately indicative of the available chlorine concentration in said liquid.

5. The method of continuously, automatically and accurately detecting the content of available chlorine in an aqueous liquid, having a concentration of available chlorine of about 0 to about 10 P. P. M., wherein accurate results are obtainable even when some of said available chlorine is in the form of dichloramine or $NCl_3$ or both, which comprises the steps of adjusting the pH of said liquid to a point in the range of about 3.5 to about 4.5 by buffering said liquid, continuously adding potassium iodide to said liquid to establish therein an iodide concentration of about 20 to about 50 P. P. M. and one which is at least stoichiometrically equivalent to the amount of available chlorine to be detected, thereafter and after a time period of at least about one minute to afford time for the substantially quantitative completion of the reaction between all said available chlorine and the added iodide, continuously introducing said liquid into contact with the polarized cathode of a depolarization type electrolytic cell, and continuously measuring the current flow through said cell as accurately indicative of all the available chlorine in said liquid, irrespective of the form in which it existed therein.

HENRY C. MARKS.

REFERENCES CITED

The following references are of record in the file of this patent:

UNITED STATES PATENTS

| Number | Name | Date |
| --- | --- | --- |
| 2,370,871 | Marks | Mar. 6, 1945 |

FOREIGN PATENTS

| Number | Country | Date |
| --- | --- | --- |
| 282,170 | Great Britain | Dec. 20, 1927 |

OTHER REFERENCES

"Journal of American Waterworks Assn.," vol. 34 (1942), pages 1227 thru 1240.

"Journal of American Chemical Society," vol. 51 (1929), pages 2112, 2113.

"The Analyst," vol. 48 (1923), page 178.

"Analytical Chemistry," by Treadwell and Hall, 7th edition (1930), vol. 2, page 558.